June 18, 1968 E. C. HUDSON, JR 3,389,230
SEMICONDUCTIVE MAGNETIC TRANSDUCER
Filed Jan. 6, 1967 2 Sheets-Sheet 1

EDWARD C. HUDSON JR.
INVENTOR.

BY

June 18, 1968     E. C. HUDSON, JR     3,389,230
SEMICONDUCTIVE MAGNETIC TRANSDUCER
Filed Jan. 6, 1967     2 Sheets-Sheet 2
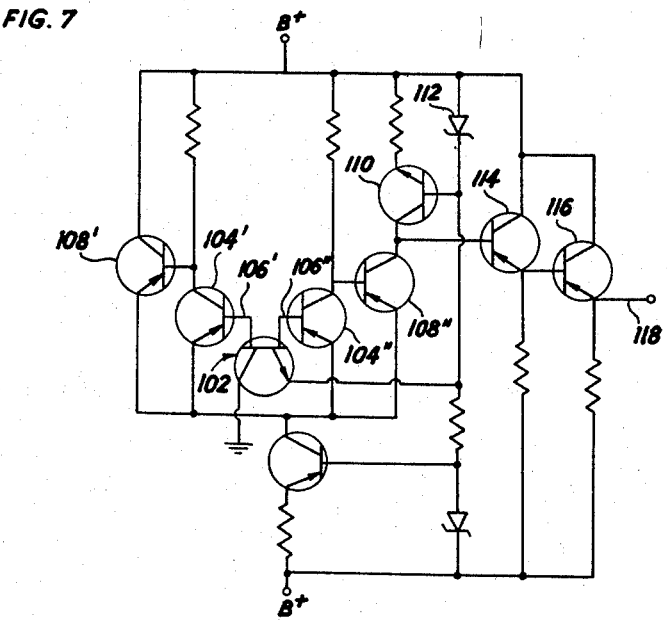
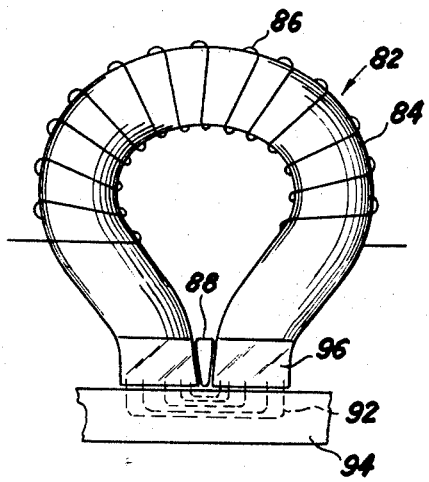
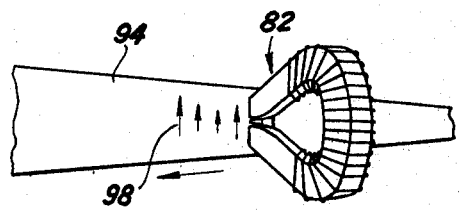
EDWARD C. HUDSON JR.
INVENTOR.

3,389,230
SEMICONDUCTIVE MAGNETIC TRANSDUCER
Edward C. Hudson, Jr., Waltham, Mass., assignor to Hudson Magiston Corporation, Jaffrey, N.H., a corporation of Massachusetts
Filed Jan. 6, 1967, Ser. No. 600,154
10 Claims. (Cl. 179—100.2)

ABSTRACT OF THE DISCLOSURE

A magnetic transducer, formed of a semiconductive material with an emitter, base and two spaced collector regions, responds directly to a magnetic field that deflects charge carriers in the base region towards one or the other of the collector regions. The magnetic field may be carried by a magnetic tape recorded with a unidirectional transverse field as it passed by the trailing edge of the core faces of a generally conventional magnetic head in a direction parallel to the main axis of the core's air gap.

Background of the invention

The invention relates to a transducer formed of a semiconductive material and constructed to directly convert magnetic flux into an electrical signal, and to a magnetic recording and reproducing system.

At present, the only common way to sense a non-varying magnetic flux and directly convert it into an electric signal is to utilize the "Hall effect." In a device exhibiting the "Hall effect," an electric potential occurs between laterally spaced points of certain materials when a magnetic field passes through the material along an axis orthogonal to the electric potential and under the influence of a transverse electric current. The physical size of such a device most be sufficient to accommodate the necessary connections and to exhibit the desired characteristics. These requirements in turn limit the sensitivity and frequency response of a "Hall effect" device.

Summary

The present invention provides a device which linearly converts either a varying or non-varying magnetic flux directly into an electrical signal without requiring an orthogonal electric potential. The device is formed of a semiconductive material, and includes contiguous emitter, base and collector layers or regions of different conductivity types similar in function to the regions of a transistor. In the preferred embodiment of the invention, the magnetic transducing device includes generally parallel layers or regions of different, alternating conductivity types consisting of an emitter region, a base region, and a collector region divided into two equal collector areas by a thin base zone. Charge carriers are caused to flow from the emitter region across the base region to the collector region, approximately half of the carriers reaching one collector area and half the other collector area. The collector areas are electrically biased relative to the base region to produce depletion zones at the collector-base junction, and between the collector areas. By varying the electric bias these depletion zones may be extended to pinch off the base zone between the collector areas and effectively eliminate the flow of any charge carriers into it. Should a magnetic field be applied to the device in a direction perpendicular to the carrier flow and parallel to the division between the collector areas, it will deflect the charge carriers in the base region particularly at the junction between the base and emitter and fewer carriers will reach one collector area than the other collector area. This creates a change in the current flow to the collector areas, which change, if the device is properly constructed, will be directly proportional to the strength of the applied magnetic field. In this manner the preferred embodiment of the invention directly converts either a steady or a varying magnetic flux into an electric signal.

Preferably the semiconductive magnetic transducer is formed by first diffusing into the central portion of one face of a block of semiconductive substance a material of a first or collector region conductivity type, then diffusing a material of the same conductivity type into two separate collector zones both of which overlap the central region. Next a material of a second conductivity type opposite to the first conductivity type is diffused into the face in a base zone overlapping the two collector zones to change the conductivity of the face but to retain two separate interior collector zones or areas separated only by the original semiconductive material. Thereafter a material of the first conductivity type is diffused into the face in an emitter zone contained within the base zone to change the conductivity of the face but to retain the interior base zone. To complete the device appropriate electrical connections may be made to the emitter zone, base zone and two collector zones. Preferably the margins of the two separate collector zones which overlap the central region are straight and parallel, and the areas of the base and emitter zones are centered over these margins.

The magnetic field applied to the semiconductive magnetic transducer preferably is carried by a magnetic tape recorded in a novel fashion. The alternating signal to be recorded is applied to the conductive coil of a generally conventional magnetic recording head together with a direct current greater than the maximum signal strength of the alternating signal. Thus while the strength of the current in the coil, and the magnetic field in the head and its core, will change with the alternating signal, the polarity or direction of the magnetic field across the air gap of the core will always be the same. Magnetic tape is driven past the air gap in a direction parallel to the main or longitudinal axis of the gap. Thus, as any portion of the tape passes under the core faces of the magnetic head on either side of the air gap, it will be subjected to a varying but unidirectional magnetic field. As this portion of tape leaves the core faces and passes beyond the trailing edge of the head, it will retain the magnetic field strength and orientation to which it was last exposed as it passed under the trailing edge of the head. Thus, while the magnetic head may be as large as is convenient, the tape records only the very narrow magnetic field at the trailing edge of the head, and this greatly increases the frequency capabilities of the system. Preferably the trailing edge surface of the magnetic head is ground flat and straight to record straight transverse bands of magnetic flux along the tape, and a magnetic keeper or shoe is positioned under the tape and spanning the faces of the core to concentrate the magnetic flux emanating from the core faces in the tape.

The magnetic recording head, the magnetic tape it records, and the semiconductive magnetic transducer may be combined into a novel magnetic recording and reproducing system with very high frequency capabilities. In the system, an electrical signal applied to the conductive coil of the magnetic recording head is recorded as transverse bands of flux across a length of magnetic tape passing by the air gap of the head. Should this length of tape later pass by the face of the semiconductive magnetic transducer, the bands of flux on the tape will deflect charge carriers flowing in the base region to produce a proportional change in the current flow in the collector areas. In this manner the recorded electrical signal is reproduced by the semiconductive magnetic transducer.

Brief description of the drawings

The invention will be further described in connection with the accompanying drawings in which:

FIGURE 5 is a plan view of a magnetic head and associated structure preferably used to record the signal reproduced by the semiconductive magnetic transducer;

FIGURE 6 is a view in elevation of the magnetic head of FIG. 5 and a portion of magnetic recording tape; and FIGURE 7 is a schematic illustration of the circuitry preferably associated with the magnetic transducer.

*Description of the preferred embodiments*

Figure 1:
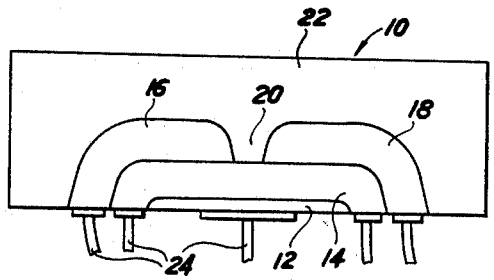
FIGURE 1 is a sectional view schematically illustrating the various regions of a device constructed according to the preferred embodiment of the invention.

The semiconductive magnetic transducing device of the invention is formed from a block of semiconductive material such as germanium. As shown in FIG. 1, the block of material 10 includes contiguous layers or regions of different conductivity types, similar to the regions of a transistor. These regions include a negative or N-type emitter region 12, a positive or P-type base region 14, two N-type collector areas or regions 16 and 18 divided by a P-type base zone 20, and a P-type base region 22 beyond the collector areas. The device is appropriately biased by connections, schematically indicated by the wires 24 extending from the face of the device, to encourage the flow of charged carriers from the emitter region through the base region to the collector areas. Since the distribution density of the charge carriers flowing through the base region 14 will be quite uniform, the two collector areas will receive amounts of charge carriers proportional to their areas overlying the emitter and base. Preferably the margins between the collector areas and base zone are straight and parallel, and the collector areas are equal in size and are centered over the base and emitter regions so that the collector areas absorb equal flows of the charge carriers passing across the base region under quiescent conditions. The collector areas are electrically biased relative to the base region by appropriate electric potentials applied through the connections to produce depletion zones at the collector-base junction, and between the collector areas. By varying the electric bias these depletion regions may be extended to pinch off the base zone and effectively eliminate the flow of any charge carriers into the base region beyond the collector areas.

When a magnetic field is applied to the semiconductive device along an axis parallel to the base zone or division between the collector areas, i.e. perpendicular to the plane of the drawing, the charge carriers flowing through the base region 14 will be deflected towards one of the collector areas, depending on the polarity of the magnetic field. This will cause one of the collector areas to receive a greater flow of charge carriers, producing a change in the current flow to the collector areas directly proportional to the strength of the applied magnetic field. For equal magnetic field strengths of all frequencies, equal charge carrier deflections will occur in the band of charge carriers rising under the base zone between the collector areas and produce equal current differences between the collector areas. The magnetic field occuring under one or the other of the collector areas will have no net affect on the current balance between the collector areas, for while it will deflect the band of charge carriers under that collector area towards or away from the base zone, depending on the polarity of the field, this band of charge carriers will still strike the same collector area and so have no net affect on the charge balance between the collectors.

The deflection of the charge carriers by the magnetic field is believed to take place primarily in the space charge region formed at the P-N junction between the emitter and base with the remainder of the deflection taking place in the base region itself. The interface between two different conductivity types of material in a semiconductor forms a P-N junction in which the acceptors of the P type region acquire a negative charge and the donors of the N type region take on a positive charge, so that both may be said to be ions. In a narrow region around this junction there is formed a space charge region in which there is substantially no imbalance of holes or electrons. With respect to a mobile carrier injected into this region therefore, the region may be considered as intrinsic silicon. With appropriate biasing, electrons are emitted from the emitter and pass through this space charge region into the base region with little interference from the lattice in the space charge region. Under these circumstances an electron in this region behaves much as it would in a vacuum and the magnetic field operates to deflect the electrons without any appreciable effect from impurities in the lattice.

The velocity $v$ for an electron falling through a potential V equals $$\left(\frac{2e}{m}V\right)^{1/2}$$

where $e$ is equal to the charge on the electron and $m$ equals the mass of the electron. If a bias voltage between the emitter and base is applied such that the net potential across the junction is approximately equal to .1 volt then an electron will require a velocity of approximately $2 \times 10^7$ centimeters per second in order to overcome this potential. In actual practice it would be expected that the velocity of the electrons flowing across the base would be somewhat less than this. The deflection of the electrons in the space charge region of the junction may be expressed using the equation for the radius of curvature of an electron moving in a free space through a constant magnetic field at right angles to its direction of motion. According to this equation, $$R = mv/EB$$

where R is the radius of curvature, and B is the magnetic field.

For a magnetic field of 100 gauss and an electron velocity of $5 \times 10^5$ cm. per second the radius of curvature would be $2.84 \times 10^{-4}$ cm. The space charge or depletion region between the base and the emitter is approximately $1.7 \times 10^{-5}$ cm. wide and hence the lateral movement of an electron passing through this region under the influence of this field would be approximately $10^{-6}$ cm.

The deflection of a charge carrier (or minority carrier) passing through the base region may be computed in a conventional manner by transforming all forces acting on the charge carrier into equivalent electric fields and then combining the electric fields to obtain the net field acting on the charge carrier. The equivalent electric field ($Ex$) produced by the magnetic field $B_z$ is:

$$Ex = \frac{V y B_z}{C} = \frac{Vx}{M}$$

where $Vy$ is the velocity of the charge carrier across the base region, C the velocity of light, $Vx$ the transverse velocity imparted to the charge carriers by the $B_z$ field, and M the mobility factor of charge carriers in the material. When the width (W) of the base region is considerably smaller (i.e. 5 microns) than the base diffusion length and the semiconductive material is germanium, then $$Vy = \frac{D}{W} + \frac{4D^2}{W^3}t_b$$

where D is the diffusion constant for the material. After integration, the total deflection (X) is:

$$X = \frac{MWB_z}{C}$$

If $B_z = 1200$ gauss, then the total deflection for charge carriers in germanium is about $3.6 \times 10^{-8}$ cm.

Since this deflection is relatively small, the other E fields occurring in the base must be considered. One such E field is produced by the impurity gradient existing across the base, but this E field will only tend to accelerate the charge carriers (or minority carriers) across the base and thus not impair their deflection. The other major E field occurring in the base region is produced by some of the minority carriers recombining with the majority charge in the base region. If the doping level in the base region is high, as is preferred, then very low injection levels will be present in the base region and the E field of the minority-majority carrier recombination will also be very low. This recombination current E field can be minimized by making electrical connection to both of the exposed end faces of the base region. This will cause any recombination current to flow away from the portion of the base region under the base zone between the collector areas, to minimize the effect of the recombination current E field on the charge carriers flowing under this zone towards one or the other of the collector areas. Thus the external magnetic field will be the major factor determining the deflection of the charge carriers across the base region, and the relative collector currents.

To vary the currents between the collector areas in accordance with a predetermined signal, the magnetic field must penetrate the device to the base region and must produce a net deflection of the charged particles between the collector areas in accordance with a predetermined signal. Penetration of the magnetic field may be obtained by increasing the strength of the field or reducing the distance to be penetrated. Since it is preferred to utilize the device to detect relatively low strength magnetic fields such as are recorded on magnetic tape, it is preferred to obtain sufficient penetration by minimizing the distance to be penetrated. This dictates that the emission layer 12 be as thin as possible consistent with the electrical requirements of the device. By electrically biasing the collector regions relative to the base region, the depletion zones thereby occurring at the collector-base interface may be extended to effectively meet in the base zone and reduce the separation between the collectors to zero.

To determine the highest possible frequency detectable by the device when placed next to the field of a moving magnetic tape, only the narrow band of charge carriers centered on the base zone need be considered. If the maximum possible deflection of the charge carriers by the maximum recorded magnetic field on the tape is $1 \times 10^{-6}$ cm., as previously calculated, then the sweep distance of the carriers across the base zone as the magnetic field changes polarity from one maximum value to the opposite will be twice $1 \times 10^{-6}$ cm. or about $2 \times 10^{-6}$ cm. Accordingly, the maximum theoretical frequency detectable by the device will be the one whose half wave length distance recorded on the tape is about $7.2 \times 10^{-3}$ cm., which distance will be related to the recording speed. If the recording speed was 100 cm./sec. then the maximum theoretical frequency detectable by the device of the invention would be about 50 megahertz. However, the straightness of the zone separating the collector areas that is obtainable with ordinary care and under ordinary conditions will reduce the maximum frequency detectable by the device to a frequency on the order of 5 mc.

Figure 2A:
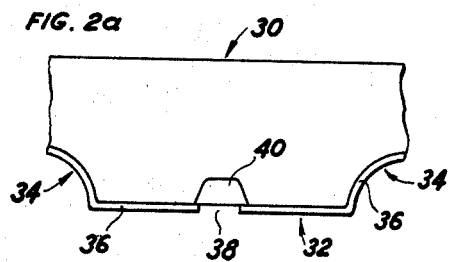
FIGURES 2a to 2d are sectional views similar to FIG. 1 showing the sequence of steps preferred to form the device.
Figure 2B:
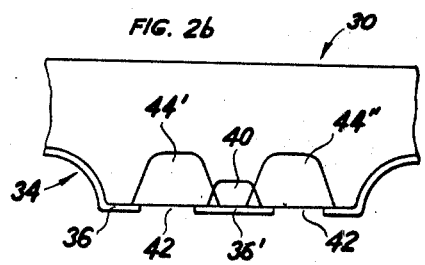
Figure 2C:
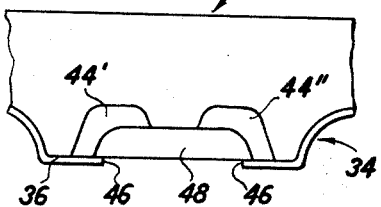
Figure 2D:
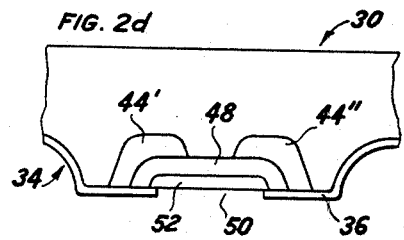

It is preferred to form the semiconductive magnetic transducer of the invention by the steps illustrated in FIGS. 2a to 2d. Commonly a large number of semiconductive devices will be formed on one block or chip of semiconductive material, and only a portion of the block is shown. To form the device of the invention is a semiconductive material 30, preferably germanium, because of the greater mobility of charges in it, a matrix of flat planes or faces 32 defined by a grid of channels 34 are formed on one surface, commonly by etching. The surface of the block next is covered or masked with the usual passivation or protective layer 36. Since it is desirable to cover all junctions as the device is being formed so that atmospheric exposure will not impair the junctions, first a narrow central strip 38 of the protective layer is removed in a conventional fashion to expose the surface of the semiconductive block. The block then is doped with a material of a first conductivity type, preferably a negative or N-type material such as phosphorous, to form a shallow negative region 40 in the semiconductive block. Next as shown in FIG. 2b, the region 40 and the zones adjacent to its margins are completely covered or masked with a protective layer 36', and areas 42 (preferably equal in size) of the protective layer removed on either side of the region 40. The block then is doped with an N-type material such as phosphorous to form two deep negative regions 44' and 44" whose adjacent margins overlap the central region 40. Now the protective layer 36' overlying the central region 40 may be removed without exposing a junction, for regions 40, 44' and 44" are of the same conductivity types. Thereafter, as shown in FIG. 2c, material is added to the protective layer to decrease the spacing between its margins 46 somewhat and to mask all but an area of the semiconductive block centered over the region 40. This exposed area is doped with a material of a second conductivity type, that is, a positive or P-type material such as boron, to form a positive region 48 which extends into the block beyond region 40 but not as deep as the regions 44. This separates the regions 44 into two discrete zones or areas which are isolated from one another by the semiconductive material 30. Then, as shown in FIG. 2d, more material is added to the protective layer 36 to decrease the spacing between its margins and to mask all but a portion of the region 48 whose area is centered over the regions 44. This exposed area 50 is doped with an N-type material again, such as phosphorous, to form a negative region 52. Thus there is formed in the block of semiconductive material by the foregoing steps two negative collector regions 44' and 44", a positive base region 48, and a negative emitter region 52. During the process no junction is exposed.

Figure 4:
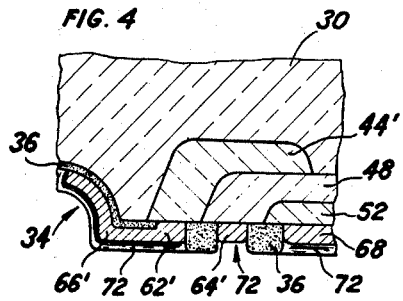
FIGURE 4 is a view in cross-section of a portion of the device shown in FIG. 3 taken on lines IV—IV.
Figure 3:
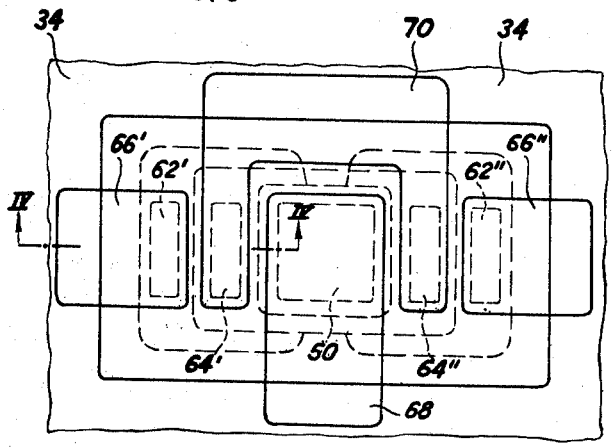
FIGURE 3 is a view of the face of the semiconductive magnetic transducing device of the invention.

To form the electrical connections to the various regions of the device, preferably portions of the protective layer are removed as shown in FIGS. 3 and 4 to expose on the face of the semiconductive block areas 62' and 62" of the two collector regions, and areas 64' and 64" of the base region. Area 50 over the emitter region was exposed during the last construction step. A conductive material is deposited over exposed collector areas 62' and 62" and in regions 66' and 66" respectively which extend well into the channels 34 previously formed in the semiconductive block. Preferably the conductive material is aluminum, for while it is a good conductor, it is also transparent to magnetic fields and will not impair their penetration of the device. These conductive regions provide electrical connections to the collector regions 44' and 44" through their respective exposed areas 62' and 62". A similar conductive material is deposited in areas over the exposed base and emitter regions and also extends into the channels 34, to provide electrical connections to the base region 48 and the emitter region 52.

By providing a conductive region 70 with two areas connected to the base region 48 at areas 64' and 64", the recombination current is directed away from the base zone between the collector areas and the E-field occurring in the base region is minimized, as previously described. External electrical leads may be attached to the portions of the conductive regions in the channels 34. By attaching the leads in these channels, the spacing between the base region and the magnetic tape or other source of magnetic field is not increased by the connections but rather is kept at a minimum, as is desired for a strong magnetic field in the base region. To assist in minimizing this spacing, part of the protective layer may be removed to provide channels 72, and the conductive regions deposited in these channels as most clearly shown in FIG. 4. Preferably, the protective layer extends beyond the outer surfaces of the conductive regions so that, should a moving magnetic tape touch the device, the hard surface of the protective layer bears on the tape and protects the conductive regions from abrasion.

While the semiconductive device of the invention will convert any properly oriented magnetic field directly into an electric signal, should a magnetic tape be used to contain the field preferably the magnetic tape is recorded using a magnetic head shown in FIGS. 5 and 6. This magnetic head 82 generally is of a common construction and includes a C-shaped core 84, an electrical conductor 86 coiled about the core, and an air gap between the ends of the core filled by a non-magnetic spacer 88. As illustrated in FIG. 5 the main or longitudinal axis of the air gap is perpendicular to the plane of the drawing. When an electric current is passed through the electrical conductor 86, it produces a magnetic field in the core 84 which field, schematically indicated by dashed lines 92, may be recorded on a magnetic tape 94 passing by the aligned ends or pole faces of the core.

Normally a magnetic tape is recorded by driving it by the air gap of a magnetic recording head in a direction perpendicular to the main axis of the air gap so that the tape passes first one pole face then the other pole face. For high frequencies, such an arrangement requires a very narrow air gap to produce a sufficiently thin magnetic field shunting the space between the ends of the core to be recorded as a discrete zone on the magnetic tape.

The magnetic recording head of the present invention is used in a manner quite different than previous heads. To record a signal, the magnetic tape is passed by the head in a direction parallel to the main or longitudinal axis of the air gap so that it passes both pole faces simultaneously. By this arrangement, for high frequency signals only the orientation of the flux at the trailing edge of the core will be recorded. Thus while the magnetic flux may be constantly changing as a portion of the tape passes beneath the head and across both pole faces, the increments of the magnetic flux will be recorded and remain only on the increments of tape then at the trailing edge of the core. This produces a flux pattern along the length of the tape corresponding to the change in the magnetic field occurring in the magnetic recording head as the tape passed by the trailing edge of the core. It is preferred to grind flat the trailing edge vertical faces 96 of the core, so that the signal pattern will be recorded in straight transverse bands across the tape, and these straight bands of magnetic flux will uniformly effect the charge carriers under the straight and narrow base zone of the semiconductive transducer.

The magnetic field recorded on the tape preferably is a unidirectional field, obtained by biasing the conductor 86 of the magnetic head with a steady direct current greater than the maximum strength of the signal to be recorded. The signal to be recorded is superimposed on this steady direct current and varies only the intensity or strength, but never the polarity or direction, of the net current passing through the conductor. This produces discrete transverse bands of flux along the tape that vary in strength but not in polarity or direction, as suggested by arrows 98 in FIG. 6. Should the recorded signal have changed polarity, adjacent fields along the tape would then be of opposite polarities and the bands of flux recorded on the tape would tend to shift to these adjacent fields of opposite polarity, rather than spanning the tape as desired. Accordingly the magnetic field recorded on the tape is a unidirectional field, and adjacent fields along the tape are always of the same polarity, although of varying strength or intensity.

The semiconductive magnetic transducer preferably is electrically incorporated in a differential amplifier circuit such as is shown in FIG. 7. Briefly, in ths circuit the two collectors of the semiconductive transducer 102 directly bias transistors 104' and 104" thru the external collector area connections 106' and 106" respectively. Thus the charge carrier current difference in the collector areas of the semiconductive magnetic transducer will produce a corresponding potential difference between the collectors of transistors 104' and 104". This potential difference is applied to transistors 108' and 108" respectively to effect a corresponding current flow through them. Since the current flow through transistor 110 will be constant because of the diode bias 112 the portion not passing through transistor 108" will bias transistor 114, and its output will drive the power transistor 116 to produce a signal at output 118 directly proportional to the charge carrier current difference in the collector areas of the semiconductive magnetic transducer. This entire circuit may be incorporated with the semiconductive magnetic transducer on a chip of semiconductive material through micromodule circuitry techniques.

While specific embodiments illustrative of the invention have been shown and described, various modifications of these embodiments will naturally occur to those skilled in this art and may be made if so desired without departing from the scope and spirit of the invention.

I claim:

1. A semiconductive magnetic transducer including a block of semiconductive material, an emitter region adjacent one surface of the block of a conductivity type tending to emit charge carriers, an interior base region contiguous with the emitter region and of a different conductivity type than the emitter region, an interior collector region contiguous with the base region and having the conductivity type of the emitter region, a narrow base conductivity type zone completely dividing the collector region into two collector areas, each collector area overlying a different portion of the emitter region, and a second base region contiguous with the collector region and having the conductivity type of the first base region whereby a magnetic field occurring in the first base region along an axis parallel to the division between the collector areas will deflect passage of charge carriers from the emitter region through the base region to the collector areas and thereby vary the division of charge carriers between the collector areas.

2. A semiconductive magnetic transducer as set forth in claim 1 in which the emitter region overlies approximately equal areas of the collector areas in which the margins between the collector areas are approximately straight and parallel, and in which the contiguous interfaces between the emitter, base, and collector regions are all approximately parallel.

3. A semiconductive magnetic transducer for converting variations in magnetic field into variations in electrical signals comprising, a multi-layer semiconductive block having at least two discrete regions of one conductivity type within said block, another region of opposite conductivity type within said block, and an emitter for producing mobile charge carriers, and means for positioning a magnetic field to pass through said semiconductive block to alter the direction of motion of said charge carriers when said magnetic field is varied, thereby altering the ratio between the number of charge carriers flowing to one of said discrete regions and the number of charge carriers flowing to the other of said discrete regions.

4. A transducer in accordance with claim 3 wherein said emitter is a region of the same conductivity type as said two discrete regions.

5. A transducer in accordance with claim 4 wherein said emitter is formed of N type material and said base is formed of P type material.

6. A transducer in accordance with claim 4 wherein said semiconductive block is formed of at least three generally parallel layers, said first layer being said emitter, said second layer being of opposite conductivity type from said emitter, and said third layer being formed to include the two discrete regions of said one conductivity type.

7. A transducer in accordance with claim 6 wherein said layers are in generally parallel superposition and wherein said two discrete regions are substantially equal in area and are symmetrically positioned with respect to the junction formed by said emitter and said second layer.

8. A magnetic transducer in accordance with claim 4 wherein said emitter is at one surface of said semiconductive block, said second layer constitutes a base region and wherein said third layer has a thin portion of base material dividing the remainder of said third layer into two discrete regions forming two separate collectors.

9. A magnetic transducer in accordance with claim 8 wherein each of said two discrete collector regions overlies a different portion of said emitter region and further including a fourth layer, said fourth layer being contiguous with said collector regions and formed as a second base region.

10. A magnetic transducer in accordance with claim 8 wherein said emitter, said base, and each of said collector regions have a portion of their surfaces metallized to serve as electrical connections for the respective regions.

References Cited

UNITED STATES PATENTS

| | | |
|---|---|---|
| 2,553,490 | 5/1951 | Wallace. |
| 2,702,316 | 2/1955 | Friend. |
| 2,779,877 | 1/1957 | Lehovec. |
| 2,866,013 | 12/1958 | Reis. |
| 2,916,639 | 12/1959 | Krembs. |
| 2,959,771 | 11/1960 | Levin. |
| 3,116,183 | 12/1963 | Pell. |
| 3,167,663 | 1/1965 | Melngailis et al. |
| 3,196,330 | 7/1965 | Moyson. |

BERNARD KONICK, *Primary Examiner.*

J. R. GOUDEAU, *Assistant Examiner.*